United States Patent
Tayu et al.

(10) Patent No.: US 7,147,686 B2
(45) Date of Patent: Dec. 12, 2006

(54) RARE EARTH MAGNET, METHOD FOR MANUFACTURING THE SAME, AND MOTOR USING RARE EARTH MAGNET

(75) Inventors: Tetsurou Tayu, Yokosuka (JP); Hideaki Ono, Yokohama (JP); Munekatsu Shimada, Hachiouji (JP); Makoto Kano, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/600,602

(22) Filed: Jun. 23, 2003

(65) Prior Publication Data

US 2004/0000359 A1 Jan. 1, 2004

(30) Foreign Application Priority Data

Jun. 27, 2002 (JP) .................. P 2002-187912

(51) Int. Cl.
C22C 29/14 (2006.01)
(52) U.S. Cl. .............. 75/244; 75/232; 75/233; 75/234; 75/246; 419/12; 419/20; 148/101; 148/102; 148/301; 148/302
(58) Field of Classification Search ............... 148/101, 148/102, 103, 301, 302; 75/232, 233, 234, 75/244, 246; 419/12, 20
See application file for complete search history.

(56) References Cited

U.S. PATENT DOCUMENTS 4,762,574 A * 8/1988 Ghandehari .......... 148/103
4,891,078 A * 1/1990 Ghandehari .......... 148/301
5,316,595 A * 5/1994 Hamada et al. ....... 148/302
2002/0112785 A1* 8/2002 Sekine et al. ........ 148/302
2004/0000359 A1* 1/2004 Tayu et al. .......... 148/302

FOREIGN PATENT DOCUMENTS

| JP | 61-253805 | 11/1986 |
|---|---|---|
| JP | 61-289605 | 12/1986 |
| JP | 63-153387 | 6/1988 |
| JP | 7-201545 | 8/1995 |
| JP | 10-321427 | 12/1998 |
| JP | 11-251125 | 9/1999 |
| JP | 2000-082610 | 3/2000 |
| JP | 2000-82610 | * 3/2000 |
| JP | 2002-064010 | 2/2002 |
| JP | 2002-64010 | * 2/2002 |
| JP | 2003-264115 | 9/2003 |

OTHER PUBLICATIONS

Machine translation of Japanese Patent Publication 2000-082610, Mar. 21, 2000.*
Machine translation of Japanese Patent Publication No. 2002-064010, Feb. 2, 2002.*

* cited by examiner

*Primary Examiner*—John P. Sheehan
(74) *Attorney, Agent, or Firm*—McDermott Will & Emery LLP

(57) ABSTRACT

A rare earth magnet comprises rare earth magnet particles and a rare earth oxide being present between the rare earth magnet particles. The rare earth oxide is represented by a following general formula (I):

$$R_2O_3 \quad (I)$$

where R is any one of terbium, dysprosium, holmium, erbium, thulium, ytterbium, and lutetium.

15 Claims, 2 Drawing Sheets

RARE EARTH MAGNET, METHOD FOR MANUFACTURING THE SAME, AND MOTOR USING RARE EARTH MAGNET

BACKGROUND OF THE INVENTION

1. Field of the Invention

The present invention relates to a rare earth magnet having high electric resistance.

2. Description of the Related Art

Low-priced ferrite magnets have been conventionally used in many cases as magnets for permanent magnet motors. However, with downsizing and increases in the performance of rotating electrical machines, consumption of high-performance rare earth magnets is increasing year by year. Typical rare earth magnets include Sm—Co type magnets and Nd—Fe—B type magnets, and developments for achieving higher performance and lower prices are now in progress.

However, since the rare earth magnet is a metallic magnet, the rare earth magnet has low electric resistance. For this reason, eddy current loss is increased when the rare earth magnet is incorporated in a motor, thereby degrading motor efficiency. Accordingly, various techniques have been proposed to solve such a problem by means of enhancing the electric resistance of the rare earth magnet itself.

Japanese Patent Application Laid-Open No. 10-321427 discloses a rare earth magnet having a structure in which rare earth magnet particles are bonded to $SiO_2$ and/or $Al_2O_3$ particles. Presence of $SiO_2$ and/or $Al_2O_3$ between the rare earth magnet particles can enhance the electric resistance of the rare earth magnet.

SUMMARY OF THE INVENTION

However, magnetic characteristics are considerably degraded by the addition of $SiO_2$ and/or $Al_2O_3$. Accordingly, such a magnet is not appropriate for application in a middle-power or high-power motor.

As described above, in the conventional technology, although the electric resistance of the rare earth magnet could be increased, such an increase has been accompanied by considerable degradation of the magnetic characteristics on the other hand.

Therefore, it is an object of the present invention to provide a rare earth magnet having high electric resistance while minimizing the degradation of magnetic characteristics thereof.

The first aspect of the present invention provides a rare earth magnet, comprising: rare earth magnet particles; and a rare earth oxide being present between the rare earth magnet particles, the rare earth oxide being represented by a following general formula (I):

$$R_2O_3 \qquad (I)$$

where R is any one of terbium, dysprosium, holmium, erbium, thulium, ytterbium, and lutetium.

The second aspect of the present invention provides a method of manufacturing a rare earth magnet, comprising: preparing a mixture including rare earth magnet powder and a rare earth oxide being represented by a following general formula (I):

$$R_2O_3 \qquad (I)$$

where R is any one of terbium, dysprosium, holmium, erbium, thulium, ytterbium, and lutetium; filling the mixture in a forming die; and forming the mixture.

The third aspect of the present invention provides a motor, comprising: a rare earth magnet including rare earth magnet particles and a rare earth oxide being present between the rare earth magnet particles, the rare earth oxide being represented by a following general formula (I):

$$R_2O_3 \qquad (I)$$

where R is any one of terbium, dysprosium, holmium, erbium, thulium, ytterbium, and lutetium.

BRIEF DESCRIPTION OF THE DRAWINGS

The invention will now be described with reference to the accompanying drawings wherein.

DETAILED DESCRIPTION OF THE PREFERRED EMBODIMENT

A first aspect of the present invention is a rare earth magnet including rare earth magnet particles and a rare earth oxide represented by the following general formula (I) being present between the rare earth magnet particles, $$R_2O_3 \qquad (I)$$

where R is any one of terbium (Th), dysprosium (Dy), holmium (Ho), erbium (Er), thulium (Tm), ytterbium (Yb), and lutetium (Lu). Firstly, the rare earth magnet of the present invention will be described with reference to the accompanying drawings.

Figure 1:
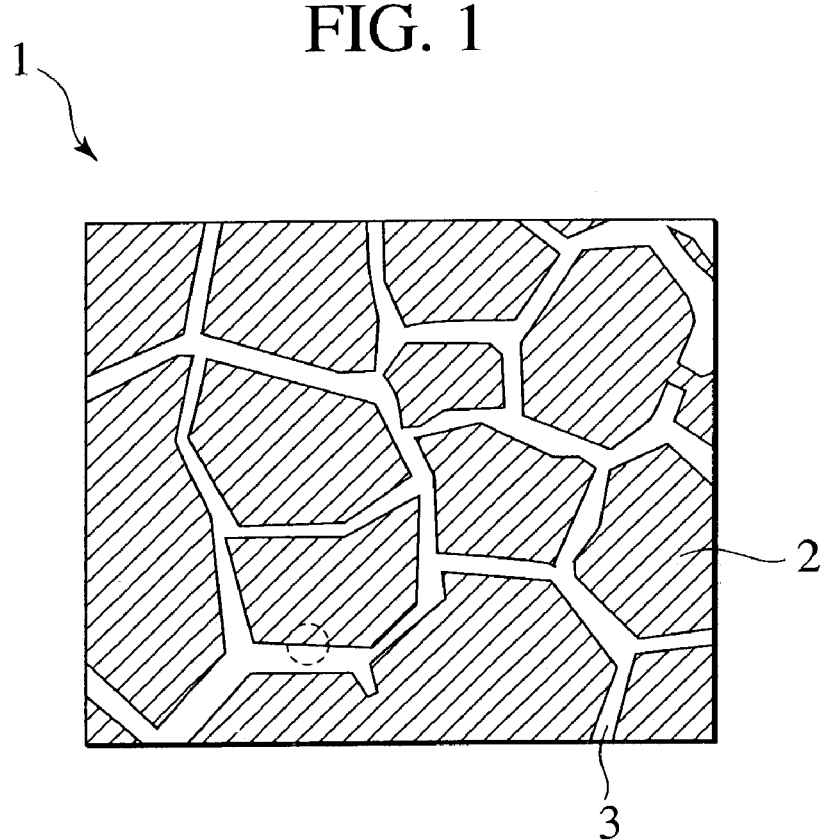
FIG. 1 is a schematic cross-sectional view of a rare earth magnet of the present invention.
Figure 2:
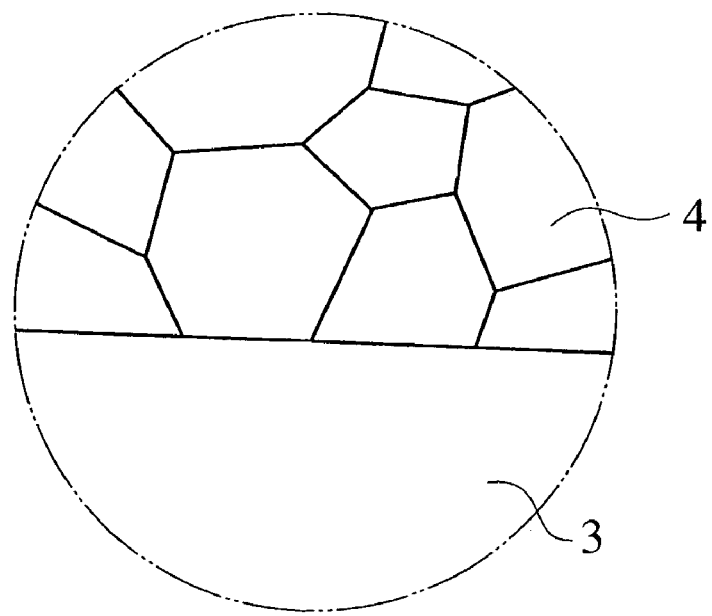
FIG. 2 is an enlarged view of a portion indicated by a dashed line in FIG. 1.

As shown in FIG. 1, the rare earth magnet 1 of the present invention includes rare earth magnet particles 2 which exhibit magnetic characteristics, and an insulating rare earth oxide 3. The rare earth oxide 3 exists between the rare earth magnet particles 2, whereby the rare earth magnet 1 is structured so that the rare earth magnet particles 2 are bonded together by the rare earth oxide 3. If anisotropic rare earth magnet powder prepared by means of hydrogenation-disproportionation-desorption-recombination method (HDDR method) or hot deformation process is used as a raw material for the rare earth magnet particles 2, then the rare earth magnet particles 2 form a cluster of numerous fine crystal grains 4 as shown in FIG. 2. In this case, the size of the rare earth magnet particle 2 is normally in a range from 1 μm to 500 μm inclusive, and the size of the crystal grain 4 constituting the rare earth magnet particle 2 is 500 nm or below. Note that the HDDR method refers to the method including the steps of: decomposing an $Nd_2Fe_{14}B$ compound as the main phase into three phases of $NdH_3$, α-Fe, and $Fe_2B$; and regenerating $Nd_2Fe_{14}B$ again by forcing dehydrogenation.

As described above, if the rare earth oxide 3 is present between the rare earth magnet particles 2 in the rare earth magnet 1, the rare earth oxide 3 functions as an insulation material, and electric resistance of the rare earth magnet 1 is significantly enhanced. Here, it is preferable that the rare earth magnet particles 2 are completely covered with the rare earth oxide 3. However, the rare earth magnet particles 2 may be partially uncovered with the rare earth oxide 3 as long as the effect of enhancing electric resistance is produced. Moreover, the shape of the rare earth oxide 3 may be formed into continuous walls to surround the rare earth magnet particles 2 as shown in the drawing, or may be formed into grains coupled to one another to isolate the rare earth magnet particles 2. It is to be noted that the drawing is simplified to facilitate understanding of the structure of the rare earth magnet 1, and the technical scope of the present invention shall not be limited only to the magnet of the illustrated aspect.

It is necessary to sufficiently increase a volume fraction of the magnet in a bulk magnet in order to obtain the rare earth magnet having a high energy product. However, since the rare earth magnet is generally hard, sufficient plastic deformation cannot be achieved by cold forming with practical applied pressure of 980 MPa or below. As a result, a magnet obtained using the foregoing process would contain numerous vacancies, thereby producing a low energy product.

Accordingly, pressure forming while softening the magnet powder with heat, i.e. pressure sintering is effective. By such pressure sintering, it is possible to subject the rare earth magnet powder as the raw material to sufficient plastic deformation and to obtain a high-density rare earth magnet. The temperature required for pressure sintering is approximately 500° C. or higher when Nd—Fe—B type rare earth magnet powder is used, for example. Therefore, an insulation material contained in the rare earth magnet is required to retain sufficient insulation performance even when the insulation material is exposed to high temperatures during pressure sintering or the like.

Meanwhile, the rare earth magnet is generally susceptive to chemical changes such as surface oxidation. Particularly, degradation of magnetic characteristics such as coercive force or residual magnetization can be a problem. Such a problem is considered to be attributable to the reduction of the insulation material by active rare earth elements contained in the magnet during manufacturing processes such as pressure sintering. Therefore, the insulation material contained in the rare earth magnet is required not to react with magnet components.

The inventors of the present invention have conducted extended studies to obtain an insulation material which satisfies the foregoing characteristics (heat resistance of the insulation material and non-reactivity with magnet components). These characteristics are deemed as being influenced by several factors. One of these factors is assumed to be a magnitude relation in terms of thermodynamic stabilities. For example, in a reaction of Nd and an oxide represented by $R_xO_y$, stability in the original system $[(4/3)Nd+(2/y)R_xO_y]$ and stability in the product $[(2/3)Nd_2O_3+(2x/y)R]$ are deemed to exert an influence on reactivity with a rare earth element. The inventors of the present invention have deduced that it is possible to find an insulation material having low reactivity with a rare earth magnet containing a chemically active rare earth element by selecting an insulation material which is considered to have low reactivity with the rare earth element.

In consideration of the factors deemed to exert an influence on the magnetic characteristics, the inventors of the present invention have conducted extended studies and found out that rare earth oxides represented by $R_2O_3$ are superior as the insulation material. Here, R is any one of terbium, dysprosium, holmium, erbium, thulium, ytterbium, and lutetium. These rare earth oxides are extremely suitable among all rare earth oxides in terms of preventing degradation of the magnetic characteristics of the rare earth magnet and enhancing the electric resistance of the rare earth magnet. Moreover, it is also possible to use rare earth oxides with different R factors at the same time. Note that a sesquioxide ($Eu_2O_3$) of europium (Eu) reacts with the rare earth magnet particles, thereby degrading the rare earth magnetic characteristics. Such degradation is deemed to happen due to the fact that $Eu_2O_3$ reacts with the rare earth magnet particles and is thereby reduced into a lower-valence oxide such as $Eu_3O_4$ or EuO. Similar degradation of the rare earth magnetic characteristics is also observed in the case of using $Sm_2O_3$ as an insulation material. Such degradation is deemed as being due to similar reasons as those described above.

Effects of the rare earth magnet of the present invention shall be summarized as follows. Firstly, the rare earth oxide is present between the rare earth magnet particles. Accordingly, the obtained rare earth magnet possesses extremely high electric resistance. Secondly, the given rare earth oxides defined in the present invention have low reactivity with rare earth elements. Accordingly, the obtained rare earth magnet possesses excellent magnetic characteristics even when harsh manufacturing conditions such as pressure sintering are applied thereto. Thirdly, the rare earth oxide contained in the rare earth magnet of the present invention possesses high heat resistance. Accordingly, the rare earth oxide can retain a sufficient insulation performance even if the rare earth oxide is exposed to high temperature conditions such as pressure sintering.

Now, description will be made further in detail regarding the rare earth magnet of the present invention.

(Rare Earth Oxides)

As described above, the composition of the rare earth oxide is a sesquioxide of any one of terbium, dysprosium, holmium, erbium, thulium, ytterbium, and lutetium. To be more precise, the rare earth oxide is any of $Tb_2O_3$, $Dy_2O_3$, $Ho_2O_3$, $Er_2O_3$, $Tm_2O_3$, $Yb_2O_3$, and $Lu_2O_3$. It is also possible to combine any two or more types of the foregoing rare earth oxides at the same time.

The content of the rare earth oxide should be determined in consideration of desired electric resistance values and magnetic characteristics. In the case of giving priority to magnetic characteristics, the content of the rare earth oxide should be suppressed. Otherwise, in the case of giving priority to the electric resistance value, then the content of the rare earth oxide should be increased. However, if the content of the rare earth oxide is too small, there is a risk that an electric resistance value of a bulk magnet is not sufficiently enhanced. For this reason, it is preferable that the rare earth oxide is contained at 0.1 mass % or more to the total mass of the magnet, or more preferably at 1 mass % or more. In the meantime, if the content of the rare earth oxide is too large, there is a risk that the degradation of the magnetic characteristics of the bulk magnet becomes substantial. For this reason, it is preferable that the rare earth oxide is contained at 20 mass % or below to the total mass of the magnet, or more preferably at 5 mass % or below.

(Rare Earth Magnet Particles)

The rare earth magnet particle includes a ferromagnetic main phase and other components. If the rare earth magnet is a Nd—Fe—B type magnet, then the main phase is the $Nd_2Fe_{14}B$ phase. From a viewpoint of the enhancement of magnetic characteristics, the rare earth magnet particles are preferably made of anisotropic rare earth magnet powder prepared by means of the HDDR method or the hot deformation process. The rare earth magnet powder prepared by means of the HDDR method or the hot deformation process is formed into a cluster of numerous crystal grains 4 as shown in FIG. 2. In this event, it is preferable in terms of enhancement in coercive force that the crystal grains 4 have an average grain size of not greater than a single-domain grain size thereof. In addition to the Nd—Fe—B type magnet, the rare earth magnet particles may include a Sm—Co type magnet. From the viewpoints of the magnetic characteristics and the manufacturing costs of the obtained rare earth magnet, the Nd—Fe—B type magnet is preferred. However, the rare earth magnet of the present invention is not limited to the Nd—Fe—B type magnet. As the case may be, the rare earth magnet may contain two or more types of rare earth magnet particles. To be more precise, two or more kinds of the Nd—Fe—B type magnets with different compositions ratios may be contained in the rare earth magnet or the Nd—Fe—B type magnet and the Sm—Co type magnet may be mixed therein.

Note that the "Nd—Fe—B type magnet" in this specification encompasses the concept of a state where part of Nd or Fe is substituted by another element. Nd may be substituted by praseodymium (Pr). Moreover, Nd may be substituted by another rare earth element such as Th, Dy, and Ho. Upon substitution, only one kind of those elements may be used or several kinds thereof may be used in combination. Such substitution can be performed by adjusting a blending ratio of a raw material alloy. Enhancement in the coercive force of the Nd—Fe—B type magnet can be achieved by such substitution. The quantity of Nd subjected to substitution is preferably set in a range from 0.01 atom % to 50 atom % inclusive with respect to Nd. If the quantity is below 0.01 atom %, there is a risk that the effect of substitution is insufficient. If the quantity is over 50 atom %, there is a risk of incapability of retaining remanent flux density at a high level.

Meanwhile, Fe may be substituted by other transition metal such as Cobalt. Such substitution can raise the Curie temperature (Tc) of the Nd—Fe—B type magnet and thereby expand the working temperature range thereof. The quantity of Fe subjected to substitution is preferably set in a range from 0.01 atom % to 30 atom % inclusive with respect to Fe. If the quantity is below 0.01 atom %, there is a risk that the effect of substitution is insufficient. If the quantity is over 30 atom %, there is a risk of excessive reduction in the coercive force.

The average grain size of the rare earth magnet particles in the rare earth magnet is preferably set in a range from 1 to 500 μm inclusive. If the average grain size of the rare earth magnet particles is below 1 μm, the specific surface area of the magnet grows large and the magnet becomes more susceptible to degradation by oxidation. Accordingly, there is a risk of degradation of magnetic characteristics of the rare earth magnet. On the contrary, if the average size is above 500 μm, the magnet particles may be crushed by pressure during the manufacturing process and it is difficult to obtain a sufficient electric resistance value. In addition, when an anisotropic magnet is manufactured using the anisotropic rare earth magnet powder as the raw material, it is difficult to align the orientation of the main phase (which is the $Nd_2Fe_{14}B$ phase in the Nd—Fe—B type magnet) in the rare earth magnet powder of a size greater than 500 μm. The grain sizes of the rare earth magnet particles are controlled by adjusting the grain sizes of the rare earth magnet powder as the raw material. Note that the average grain size of the rare earth magnet particles can be calculated from an scanning electron microscope (SEM) image (this is applicable throughout the specification).

(Types of Rare Earth Magnet)

The present invention is applicable to any of an isotropic magnet made of isotropic magnet powder, an isotropic magnet fabricated by subjecting anisotropic magnet powder to random orientation, and an anisotropic magnet fabricated by orienting anisotropic magnet powder in a certain direction. If a magnet having a high energy product is required, then the anisotropic magnet, which is made of the anisotropic magnet powder as the raw material and is subjected to orientation in a magnetic field, is preferred.

Next, description will be made regarding a second aspect of the present invention, which is a method of manufacturing a rare earth magnet. The second aspect of the present invention is a method of manufacturing a rare earth magnet including the steps of: (1) preparing a mixture including of rare earth magnet powder and rare earth oxide powder represented by the following formula (I), $$R_2O_3 \qquad (I)$$

(where R is any one of terbium, dysprosium, holmium, erbium, thulium, ytterbium, and lutetium); (2) filling the mixture in a forming die; and (3) forming the mixture.

Now, the method will be described in the order of the respective steps. In performing the manufacturing method of the present invention, it is possible to add other steps in order to enhance productivity or the characteristics of the obtained magnet. Moreover, any well-known improvements may be also applicable. The manufacturing method including such additions or improvements shall be deemed as being encompassed by the technical scope of the present invention as long as the method includes the steps defined in this specification.

(Preparation of Mixture)

First, the rare earth magnet powder and the given rare earth oxide powder are prepared.

The rare earth magnet powder is manufactured by blending the raw materials in accordance with the composition of the rare earth magnet to be manufactured. When the Nd—Fe—B type magnet having the main phase of the $Nd_2Fe_{14}B$ phase is manufactured, the given proportions of Nd, Fe and B are blended. As for the rare earth magnet powder, it is possible to use a product manufactured by means of a well-known method or a commercially available product. It is preferable to use anisotropic rare earth magnet powder manufactured by means of the HDDR method or the UPSET method utilizing the hot deformation process. Such an anisotropic rare earth magnet powder includes a cluster of numerous crystal grains. It is preferable in terms of the enhancement of coercive force that the crystal grains constituting the anisotropic rare earth magnet powder have an average grain size not greater than a single-domain critical grain size thereof. To be more precise, the average grain size of the crystal grains should be set to 500 nm or below. Note that the UPSET method refers to the method including the steps of: crushing an Nd—Fe—B type alloy fabricated by the rapid solidification; pre-forming the alloy; and subjecting the alloy to hot deformation process.

The average grain size of the rare earth magnet powder is preferably set in a range from 1 to 500 μm inclusive. If the average grain size of the rare earth magnet powder is below 1 μm, the specific surface area of the rare earth magnet powder grows large and the powder becomes more susceptible to degradation by oxidation. Accordingly, there is a risk of degradation of the magnetic characteristics of the rare earth magnet. However, if the average grain size of the rare earth oxide powder is above 500 μm, the magnet particles may be crushed by pressure during the manufacturing process and the electric resistance of the obtained rare earth magnet may be thereby reduced. In addition, when an anisotropic magnet is manufactured by means of the anisotropic rare earth magnet powder as the raw material, it is difficult to align the orientation of the main phase (which is the $Nd_2Fe_{14}B$ phase in the Nd—Fe—B type magnet) in the rare earth magnet powder in the size above 500 μm. The average grain sizes of the rare earth magnet particles can be controlled by selecting a crusher and by screening the rare earth magnet particles being crushed.

In the last result, the rare earth oxide powder will be contained as an insulation material in the rare earth magnet. To be more precise, the rare earth oxide powder is selected from $Tb_2O_3$, $Dy_2O_3$, $Ho_2O_3$, $Er_2O_3$, $Tm_2O_3$, $Yb_2O_3$, and $Lu_2O_3$. It is possible to use two or more kinds of the above oxides at the same time. As for the rare earth oxide powder, a variety of commercially available products may be used directly or after crushing with a crusher such as a ball mill. It is also possible to obtain the rare earth oxide powder by oxidizing rare earth element grains of a given size. If the average grain size of the rare earth oxide powder is too large, contacts among the magnet particles are increased and the resistivity of a bulk magnet is thereby reduced. In the meantime, fabrication of ultra-fine particles is complicated. Accordingly, the average grain size of the rare earth oxide powder is preferably set approximately in a range from 0.1 to 3 μm inclusive.

The mixture is obtained by means of the rare earth magnet powder and the rare earth oxide powder. In the present invention, the "mixture" refers not only to simple blending of the rare earth magnet powder and the rare earth oxide powder, but also to the state where the rare earth magnet powder and the rare earth oxide powder are physically or chemically bonded together. In the last result, considering the state where the rare earth magnet particles are supposed to be surrounded by the rare earth oxide as shown in FIG. 1, it is preferable in terms of operating efficiency that the mixture is formed in a manner whereby the rare earth oxide powder covers the rare earth magnet powder. The method of producing the mixture is not particularly limited, and various well-known technologies are applicable in accordance with the desired condition of the mixture. To cover the rare earth magnet powder with the rare earth oxide powder, it is possible to use the MOCVD method or the like adopting a rare earth complex as a starting material. The rare earth complex for use therein is preferably a compound having vapor pressure of several Torr or more even at a temperature of 200° C. or below. For example, assuming that dysprosium is used therein, the rare earth complex may be tris(2,2,6,6-tetramethyl-3,5-heptanedionate) dysprosium(III), tris(cyclopentadienyl) dysprosium(III) dysprosium tri-i-propoxide, or the like. As needs require, it is also possible to use the method of coating surfaces of the rare earth magnet powder with a solution containing the rare earth oxide powder. Other methods are also applicable, of course. The quantity of the rare earth oxide in the mixture is preferably set at from 0.1 to 20 mass % inclusive, or more preferably from 1 to 5 mass % inclusive, with respect to the total amounts of the rare earth magnet powder and the rare earth oxide powder. A sieve can be used to control the grain sizes of the rare earth oxide powder to be used therein.

(Filling of Mixture into Forming Die)

The mixture is filled into the forming die. The shape of the forming die is not particularly limited, and the shape should be determined in accordance with the region where the magnet is applied. When the mixture is filled in the forming die, it is preferable to pre-form the mixture by applying pressure appropriately. Such pressure upon pre-forming is set in a range from 98 to 490 MPa approximately. Here, if the rare earth magnet powder used therein is anisotropic magnet powder, then it is possible to obtain an anisotropic rare earth magnet by pre-forming the rare earth magnet powder while subjecting the rare earth magnet powder to magnetic field orientation. In this case, the magnetic field to be applied thereto is set in a range from 1.2 to 2.0 MA/m approximately.

(Forming of Mixture)

The mixture filled in the forming die is formed, and a bulk magnet is obtained. Note that the above-described operation of binding the mixture by pre-forming will not be deemed as part of "forming" in this specification. Upon forming, it is possible to use well-known systems which are generally used in manufacturing magnets. It is preferable to form the mixture by pressure sintering. When the mixture is formed by means of pressure sintering, it is possible to subject the rare earth magnet powder as the raw material to sufficient plastic deformation and to obtain a high-density rare earth magnet. Although the method of pressure sintering is not particularly limited, it is possible to use the hot-press method or the spark plasma sintering method. Particularly, use of a spark plasma sintering system has an advantage in that the mixture can be solidified fast. The pressure of forming is set in a range from 49 to 980 MPa approximately. Moreover, the sintering conditions are set generally for a period of 0 to 5 minutes at the temperature of 600° C. to 850° C. Normally, such sintering takes place in vacuum or under an inert gas flow.

When the anisotropic magnet powder is used as the raw material magnet powder, the magnet powder may be subjected to magnetic field orientation upon forming, as is well known. It is possible to enlarge residual magnetization in the orientation by forming the raw material magnet powder in a state where easy axis of magnetization thereof is well aligned. Accordingly, it is possible to increase the energy product of the magnet. Here, the magnetic field to be applied for orientation is set in a range from 1.2 to 2.0 MA/m approximately.

The temperature during the process of forming the mixture is not particularly limited. However, in consideration of operation facilities and costs, it is preferable to compress at the temperature of the working environment. Moreover, regarding the working environment, it is preferable to pay attention to conditions such as humidity in order to avoid degradation of the mixture by oxidation.

(Treatment after Forming)

Various treatments are performed after forming, such as working (cutting, polishing, and the like), a surface treatment (formation of a protective film, painting, and the like), magnetizing, and the like.

Upon working of the rare earth magnet, various well-known technologies can be appropriately applied. Specifically, a variety of working operations are possible such as grinding (external grinding, internal grinding, flat surface grinding, and formation grinding), cutting (outer circumference cutting and inner circumference cutting), lapping and chamfering. As for working tools, it is possible to use diamond, a GC grindstone, an inner/outer circumference cutter, an inner/outer circumference grinder, a flat surface grinder, an NC lathe, a milling machine, a machining center, and the like.

Since the rare earth magnet is easily oxidized, a protective film on the surface of the magnet may be provided. The constitution of the protective film is not particularly limited, and accordingly, a preferred composition may be selected in accordance with the magnetic characteristics and the thickness thereof may be determined so as to achieve a sufficient protective effect. Concrete examples of the protective film include a metallic film, an inorganic compound film, and an organic compound film. The metallic film includes Titanium (Ti), Tantalum (Ta), Calcium (Ca), Molybdenum (Mo), and Nickel (Ni). The inorganic compound film includes transition metal nitride film such as Titanium nitride (TiN), Iron nitride (FeN) and Chromium nitride (CrN), and transition metal oxide film such as Nickel oxide (NiO) and Iron oxide (FeO). Meanwhile, the organic compound film includes resin film made of epoxy resin, phenol resin, polyurethane, polyester, or the like. When the protective film is made of the metallic film or the inorganic compound film, the thickness of the protective film is preferably set in a range from about 0.01 to 10 µm inclusive. When the protective film is made of the organic compound film, the thickness is preferably set in a range from about 1 to 10 µm inclusive. Moreover, when an electrically-conductive protective film is used, such a protective film is preferably formed thin (10 µm or below, for example) because heat is generated if the protective film is thick.

Magnetizing can take place in a static magnetic field or a pulsed magnetic field. A guideline for achieving a magnetizing state close to saturation is defined as magnetic field strength twice or more larger than a coercive force of an obtainable magnet, or more preferably equivalent to fourfold the coercive force of the obtainable magnet.

Figure 3:
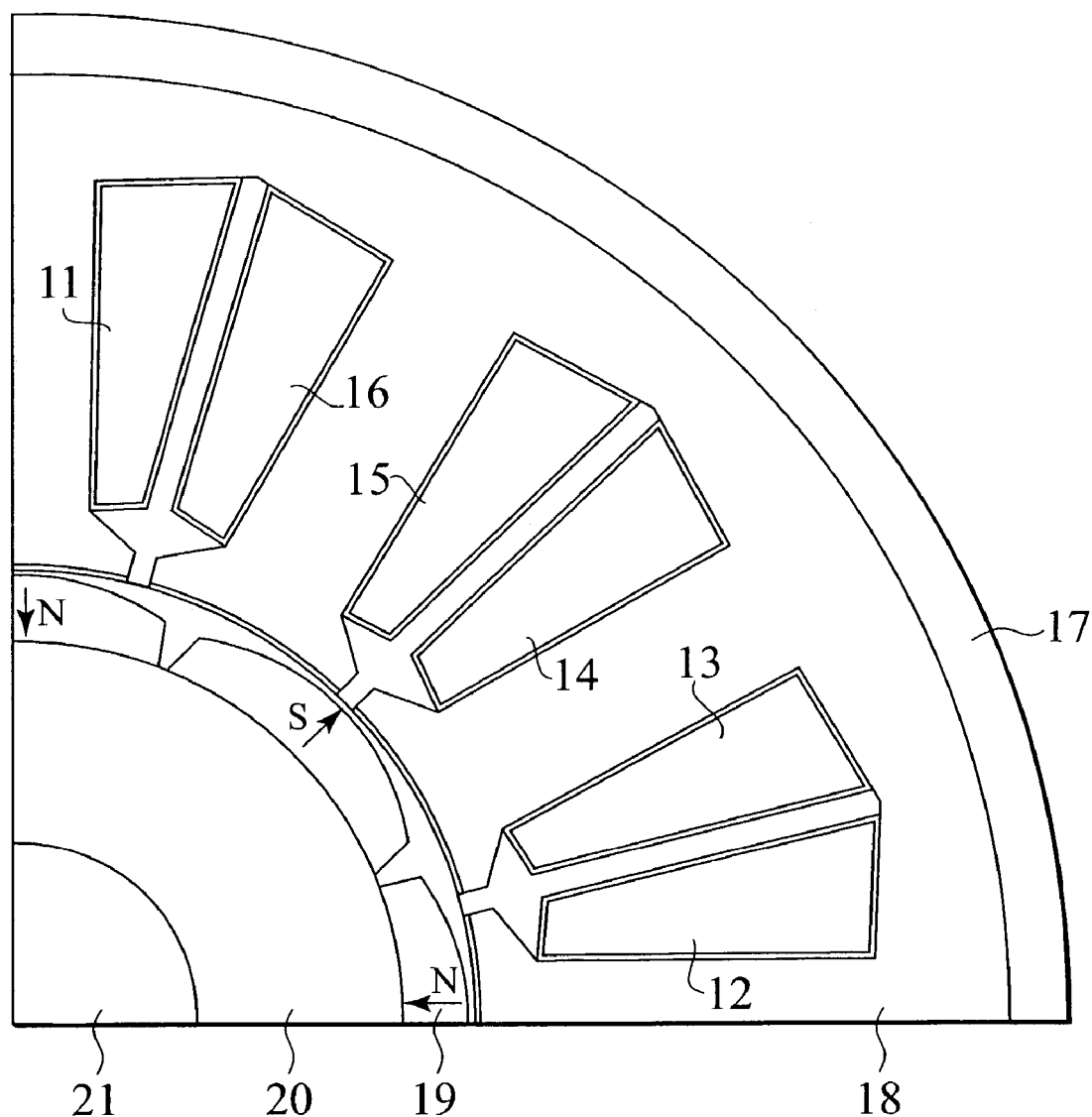
FIG. 3 is a one-quarter cross-sectional view of a surface magnet motor of concentrated winding type, which adopts the high electric resistance rare earth magnet of the present invention.

Subsequently, description will be made regarding a motor, which is a third aspect of the present invention. The third aspect of the present invention is a motor adopting the rare earth magnet according to the first aspect of the present invention. As shown in FIG. 3, reference numeral 11 denotes a u-phase coil, reference numeral 12 denotes another u-phase coil, reference numeral 13 denotes a v-phase coil, reference numeral 14 denotes another v-phase coil, reference numeral 15 denotes a w-phase coil, reference numeral 16 denotes another w-phase coil, reference numeral 17 denotes an aluminum case, reference numeral 18 denotes a stator, reference numeral 19 denotes a magnet, reference numeral 20 denotes a rotor iron core, and reference numeral 21 denotes an axle. The rare earth magnet of the present invention possesses high electric resistance and excellent magnetic characteristics. For this reason, it is easily possible to enhance continuous output of a motor by utilizing a motor manufactured by means of the rare earth magnet of the present invention. Such a motor is suitable for a middle-power or high-power motor. Moreover, since the motor using the rare earth magnet of the present invention possesses excellent magnetic characteristics, it is possible to downsize an end product. For example, if the motor is applied to a car component, it is possible to improve fuel efficiency of the car with regards to weight reduction of a car body. Furthermore, the motor of the present invention is also effective for a driving motor particularly in an electric car or a hybrid car. It is possible to install the driving motor in a space which has been previously too small for such installation, whereby the motor of the present invention is anticipated to play a major role in diffusion of electric cars and hybrid cars.

Now, the present invention will be described in conjunction with some examples. However, it is to be noted that the present invention shall not be limited by the following examples.

EXAMPLE 1

Nd—Fe—B type anisotropic magnet powder prepared by means of the well-known HDDR method was used as the rare earth magnet powder. Concrete procedures for preparation were as follows. Firstly, an ingot having a composition defined as $Nd12.6Fe_{62.6}Co_{17.4}B_{6.5}Ga_{0.3}Al_{0.5}Zr_{0.1}$ was prepared. The ingot was retained at 1120° C. for 20 hours for homogenization. The homogenized ingot was then heated from a room temperature up to 500° C. and retained at the same temperature in a hydrogen atmosphere, and then heated again up to 850° C. and retained at the same temperature. Subsequently, the ingot was retained at 850° C. in vacuum, and then cooled down to obtain an alloy including a fine ferromagnetic recrystallization texture (crystal grains). The alloy was powdered in argon gas by means of a jaw crusher and a Braun mill and thereby formed into a rare earth magnetic powder having an average grain size of 300 µm or below.

$Tb_2O_3$ powder was used as the rare earth oxide powder. The average grain size of the rare earth oxide powder was adjusted to about 0.6 µm by means of a ball mill.

Then, the mixture containing the rare earth magnet powder and the rare earth oxide powder was prepared by means of the foregoing ingredients. Here, the added amount of the $Tb_2O_3$ powder was adjusted to 7 mass % of the total mass of the mixture.

The mixture was then filled in the forming die. Subsequently, the rare earth magnetic powder was subjected to magnetic field orientation and pre-forming while applying a magnetic field to the mixture in the forming die. The magnetic field for orientation was set to 1.6 MA/m and the forming pressure was set to $2 \times 10^2$ MPa.

The pre-formed mixture was then formed by pressure sintering in a vacuum, and a bulk rare earth magnet was thereby obtained. A spark plasma sintering system was used for forming. The sintering temperature was set to 800° C., meanwhile, the retention time was set at 3 minutes and the forming pressure was set to $2 \times 10^2$ MPa. The density, the coercive force, the maximum energy product, and the electric resistivity of the obtained rare earth magnet were measured. The magnet density was computed from the dimensions and the mass of the rare earth magnet. The magnetic characteristics (the coercive force and the maximum energy product) were obtained by magnetizing a test piece in advance at a magnetizing field of 10 T by means of a pulse excitation type magnetizer MPM-15 made by Toei Industries, Co. Ltd.; and measuring the test piece by means of a BH analyzer TRF-5AH-25Auto made by Toei Industries, Co. Ltd. Meanwhile, the electric resistivity was measured by a four-point probe method using a resistivity probe made by NPS Inc. The material of the probe needles was tungsten carbide, the tip radius of the needle was 40 µm, the needle interval was 1 mm, and the total weight of the four needles was set to about 400 g. Note that a similar measuring method was used in evaluation of rare earth magnets to be obtained in other examples and comparative examples to be described later. The magnet density of the obtained rare earth magnet was $7.6 \times 10^3$ kg/m$^3$, the coercive force was 0.98 MA/m, the maximum energy product was 0.22 MJ/m$^3$, and the electric resistivity was 35.0 µΩm. The results are shown in Table 1.

The obtained rare earth magnet was an anisotropic Nd—Fe—B type rare earth magnet having an excellent maximum energy product and excellent electric resistivity.

EXAMPLE 2

A bulk rare earth magnet was obtained as similar to Example 1 except that $Dy_2O_3$ powder with an average grain size of about 0.5 μm was used as the rare earth oxide and that added amount of the $Dy_2O_3$ powder was set at 5 mass % of the total mass of the mixture. The density, the coercive force, the maximum energy product, and the electric resistivity of the obtained rare earth magnet were measured. The magnet density of the obtained rare earth magnet was $7.6 \times 10^3$ kg/m³, the coercive force was 0.96 MA/m, the maximum energy product was 0.23 MJ/m³, and the electric resistivity was 32.0 μΩm. The results are shown in Table 1.

The obtained rare earth magnet was an anisotropic Nd—Fe—B type rare earth magnet having an excellent maximum energy product and excellent electric resistivity.

EXAMPLE 3

A bulk rare earth magnet was obtained as similar to Example 1 except that $Ho_2O_3$ powder with an average grain size of about 0.9 μm was used as the rare earth oxide and that added amount of the $DY_2O_3$ powder was set at 6 mass % of the total mass of the mixture. The density, the coercive force, the maximum energy product, and the electric resistivity of the obtained rare earth magnet were measured. The magnet density of the obtained rare earth magnet was $7.6 \times 10^3$ kg/m³, the coercive force was 0.92 MA/m, the maximum energy product was 0.21 MJ/m³, and the electric resistivity was 31.0 μΩm. The results are shown in Table 1.

The obtained rare earth magnet was an anisotropic Nd—Fe—B type rare earth magnet having an excellent maximum energy product and excellent electric resistivity.

EXAMPLE 4

Nd—Fe—B type anisotropic magnet powder prepared by means of the well-known UPSET method was used as the rare earth magnet powder. Concrete procedures for preparation were as follows. Firstly, an ingot having a composition defined as $Nd_{13.7}Fe_{73.5}Co_{6.7}B_{5.5}Ga_{0.6}$ was prepared. The ingot was subjected to high-frequency fusion, and the fused ingot was sprayed on a single roll rotated at a peripheral velocity of 30 m/s to obtain Nd—Fe—B type ribbons. The ribbons were then crushed with a mortar and adjusted to have an average grain size of 350 μm or below. Next, the crushed ribbons were filled in a cylindrical container made of mild steel, and then the cylindrical container was vacuumized and hermetically sealed. The container was heated at a high frequency up to 800° C. and then compressed uniaxially by means of a pressing machine. Subsequently, the Nd—Fe—B type magnetic material was taken out of the container and processed into the rare earth magnetic powder having the average grain size of 300 μm or below by means of a coffee mill.

$Tm_2O_3$ powder was used as the rare earth oxide powder. The average grain size of the rare earth oxide powder was adjusted to about 0.5 μm using a ball mill.

Then, the mixture containing the rare earth magnet powder and the rare earth oxide powder was prepared using the foregoing ingredients. Here, added amount of the $Tm_2O_3$ powder was adjusted to 4 mass % of the total mass of the mixture.

The mixture was then filled in the forming die. Subsequently, the rare earth magnetic powder was subjected to magnetic field orientation and pre-forming while applying a magnetic field to the mixture in the forming die. The magnetic field for orientation was set to 1.6 MA/m and the forming pressure was set to $2 \times 10^2$ MPa.

The pre-formed mixture was then formed by pressure sintering in a vacuum, and a bulk rare earth magnet was thereby obtained. A hot press machine was used upon forming. The sintering temperature was set at 800° C., meanwhile, the retention time was set at 40 minutes and the forming pressure was set to $2 \times 10^2$ MPa. The density, the coercive force, the maximum energy product, and the electric resistivity of the obtained rare earth magnet were measured. The magnet density of the obtained rare earth magnet was $7.6 \times 10^3$ kg/m³, the coercive force was 0.90 MA/m, the maximum energy product was 0.22 MJ/m³, and the electric resistivity was 26.0 μΩm. The results are shown in Table 1.

The obtained rare earth magnet was an anisotropic Nd—Fe—B type rare earth magnet having an excellent maximum energy product and excellent electric resistivity.

Comparative Example 1

A bulk rare earth magnet was obtained as similar to Example 1 except for the addition of $Tb_2O_3$ powder as the rare earth oxide. The density, the coercive force, the maximum energy product, and the electric resistivity of the obtained rare earth magnet were measured. The magnet density of the obtained rare earth magnet was $7.6 \times 10^3$ kg/m³, the coercive force was 0.97 MA/m, the maximum energy product was 0.26 MJ/m³, and the electric resistivity was 1.4 μΩm. The results are shown in Table 1.

The obtained rare earth magnet exerted an excellent maximum energy product. However, the rare earth magnet was an anisotropic Nd—Fe—B type rare earth magnet having very poor electric resistivity because the given rare earth oxide defined in the present invention had not been added thereto.

Comparative Example 2

A bulk rare earth magnet was obtained as similar to Example 1 except that $Tb_4O_7$ powder with an average grain size of about 0.9 μm was used as the rare earth oxide and that the added amount of the $Tb_4O_7$ powder was set at 10 mass % of the total mass of the mixture. The density, the coercive force, the maximum energy product, and the electric resistivity of the obtained rare earth magnet were measured. The magnet density of the obtained rare earth magnet was $7.6 \times 10^3$ kg/m³, the coercive force was 0.36 MA/m, the maximum energy product was 0.08 MJ/m³, and the electric resistivity was 5.0 μΩm. The results are shown in Table 1.

The obtained rare earth magnet exerted a poor maximum energy product and poor electric resistivity. This is deemed attributable to the fact that the $Tb_4O_7$ being added as the rare earth oxide is deprived of oxygen by Neodymium contained in the rare earth magnet powder, upon forming by pressure sintering.

Comparative Example 3

A bulk rare earth magnet was obtained as similar to Example 1 except that $HfO_2$ powder with the average grain size of about 2 μm was used as the rare earth oxide and that the added amount of $HfO_2$ powder was set at 10 mass % of the total mass of the mixture. The density, the coercive force, the maximum energy product, and the electric resistivity of the obtained rare earth magnet were measured. The magnet density of the obtained rare earth magnet was $7.8 \times 10^3$ kg/m$^3$, the coercive force was 0.09 MA/m, the maximum energy product was 0.02 MJ/m$^3$, and the electric resistivity was 2.4 μΩm. The results are shown in Table 1.

The obtained rare earth magnet exerted a poor maximum energy product and the poor electric resistivity. This is deemed attributable to the fact that the HfO$_2$ added as the electrically insulating oxide is deprived of oxygen by Neodymium contained in the rare earth magnet powder, upon forming by pressure sintering.

Comparative Example 4

The Nd—Fe—B type anisotropic magnet powder (the HDDR magnet powder; the average grain size of 300 μm or below) prepared by the method similar to Example 1 was used as the rare earth magnet powder. Epoxy resin was added thereto and mixed therewith. Here, the added amount of epoxy resin was adjusted to 2 mass % of the total mass of the mixture.

The mixture was then filled in the forming die. Subsequently, the rare earth magnetic powder was subjected to magnetic field orientation and pressure forming while applying a magnetic field to the mixture in the forming die. Accordingly, the rare earth magnet was obtained. The magnetic field for orientation was set to 1.6 MA/m and the forming pressure was set to $9.8 \times 10^2$ MPa. The density, the coercive force, the maximum energy product, and the electric resistivity of the obtained rare earth magnet were measured. The magnet density of the obtained rare earth magnet was $5.9 \times 10^3$ kg/m$^3$, the coercive force was 0.91 MA/m, the maximum energy product was 0.16 MJ/m$^3$, and the electric resistivity was 15.2 μΩm. The results are shown in Table 1.

The obtained rare earth magnet exerted a maximum energy product and the electric resistivity considerably inferior to those of the rare earth magnet of the present invention.

sheets. The magnets 19 of the illustrated shapes were disposed on the rotor iron core 20. Meanwhile, reference numeral 21 denotes the axle. The continuous output of the motor manufactured by means of the rare earth magnet of Example 1 was 1.8 kW.

Comparative Example 5

A motor was manufactured as similar to Example 5 except that the rare earth magnet obtained in Comparative Example 1 was used therein. The motor thus manufactured exerted a continuous output of 1.2 kW.

The rare earth magnet of the present invention exerts high electric resistance and low eddy current loss. Accordingly, the rare earth magnet of the present invention shows low heat generation and is therefore advantageous in terms of thermal design. Moreover, the rare earth magnet of the present invention also possesses excellent magnetic characteristics. Accordingly, the rare earth magnet of the present invention was proved to effectuate enhancement in continuous output of a motor easily.

The entire content of a Japanese Patent Application No. P2002-187912 with a filing date of Jun. 27, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A method of manufacturing a rare earth magnet, comprising:
    forming a rare earth magnet particle constituted by a cluster of numerous crystal grains,

TABLE 1

| Type of rare earth magnet powder | Rare earth oxide | Added amount of rare earth oxide (mass %) | Magnet density (kg/m$^3$) | Coercive force (MA/m) | Maximum energy product (MJ/m$^3$) | Electric resistivity (μΩm) |
|---|---|---|---|---|---|---|
| Ex. 1 | HDDR | Tb$_2$O$_3$ | 7 | $7.6 \times 10^3$ | 0.98 | 0.22 | 35.0 |
| Ex. 2 | HDDR | Dy$_2$O$_3$ | 5 | $7.6 \times 10^3$ | 0.96 | 0.23 | 32.0 |
| Ex. 3 | HDDR | Ho$_2$O$_3$ | 6 | $7.6 \times 10^3$ | 0.92 | 0.21 | 31.0 |
| Ex. 4 | UPSET | Tm$_2$O$_3$ | 4 | $7.6 \times 10^3$ | 0.90 | 0.22 | 26.0 |
| Com. Ex. 1 | HDDR | None | 0 | $7.6 \times 10^3$ | 0.97 | 0.26 | 1.4 |
| Com. Ex. 2 | HDDR | Tb$_4$O$_7$ | 10 | $7.6 \times 10^3$ | 0.36 | 0.08 | 5.0 |
| Com. Ex. 3 | HDDR | HfO$_2$ | 10 | $7.8 \times 10^3$ | 0.09 | 0.02 | 2.4 |
| Com. Ex. 4 | HDDR | — | — | $5.9 \times 10^3$ | 0.91 | 0.16 | 15.2 |

EXAMPLE 5

The rare earth magnet obtained in Example 1 was applied to a surface magnet motor (including a 12-pole stator and an 8-pole rotor). FIG. 3 is a one-quarter cross-sectional view of the surface magnet motor of a concentrated winding type thus fabricated. The aluminum case 17 is placed outside, and the stator 18 is placed inside. Reference numerals 11 and 12 denote the u-phase coils, reference numerals 13 and 14 denote the v-phase coils, and reference numerals 15 and 16 denote the w-phase coils. Moreover, the stator 18 was formed into a laminated body of electromagnetic steel preparing a mixture including the rare earth magnet particle and a rare earth oxide being represented by a following general formula (I);

$$R_2O_3 \qquad (I)$$

where R is any one of terbium, dysprosium, holmium, erbium, thulium, ytterbium, and lutetium;

filling the mixture in a molding die; and molding the mixture at a temperature of 600° C. to 850° C.

2. The method of manufacturing a rare earth magnet of claim 1, further comprising:

between the filling and the molding, pre-molding the mixture while the rare earth magnet powder being subjected to magnetic field orientation,
wherein the rare earth magnet particle is anisotropic magnet.

3. The method of manufacturing a rare earth magnet of claim 1,
wherein the molding is a step which molds the mixture by pressure sintering.

4. The method of manufacturing a rare earth magnet of claim 1,
wherein the rare earth magnet particle is formed by HDDR method or UPSET method.

5. The method of manufacturing a rare earth magnet of claim 1,
wherein the preparing the mixture is performed by MOCVD method.

6. A rare earth magnet, comprising:
a sintered body including: rare earth magnet particles; and a rare earth oxide being present only between the rare earth magnet particles, the rare earth oxide being represented by a following general formula (I):

$$R_2O_3 \qquad (I)$$

where R is any one of terbium, dysprosium, holmium, erbium, thulium, ytterbium, and lutetium,
wherein the rare earth magnet particle is constituted by a cluster of numerous crystal grains.

7. The rare earth magnet of claim 6,
wherein the rare earth magnet is a Nd—Fe—B type magnet.

8. The rare earth magnet of claim 6,
wherein the rare earth magnet is an anisotropic magnet.

9. The rare earth magnet of claim 6,
wherein a size of the crystal grain is not greater than a single-domain critical grain size.

10. The rare earth magnet of claim 6, further comprising:
a protective film provided on a surface of the rare earth magnet.

11. The rare earth magnet of claim 6,
wherein a content of the rare earth oxide in the rare earth magnet is within a range from 0.1 mass % to 20 mass %.

12. The rare earth magnet of claim 11,
wherein the content is within a range from 1 mass % to 5 mass %.

13. A motor, comprising:
a rare earth magnet including a sintered body having rare earth magnet particles and a rare earth oxide being present only between the rare earth magnet particles, the rare earth oxide being represented by a following general formula (I):

$$R_2O_3 \qquad (I)$$

where R is any one of terbium, dysprosium, holmium, erbium, thulium, ytterbium, and lutetium
wherein the rare earth magnet particle is constituted by a cluster of numerous crystal grains.

14. The motor of claim 13,
wherein a size of the crystal grain is not greater than a single-domain critical grain size.

15. The motor of claim 13,
wherein the rare earth magnet is coated with a protective film.

* * * * *